United States Patent [19]

Suzuki et al.

[11] Patent Number: 4,609,064
[45] Date of Patent: Sep. 2, 1986

[54] PART-TIME FOUR-WHEEL DRIVE SYSTEM WITH STEERING ANGLE RESPONSIVE CONTROL

[75] Inventors: Kunihiko Suzuki, Sagamihara; Koji Enomoto, Ebina, both of Japan

[73] Assignee: Nissan Motor Co., Ltd., Japan

[21] Appl. No.: 601,023

[22] Filed: Apr. 16, 1984

[30] Foreign Application Priority Data

May 24, 1983 [JP] Japan ............................. 58-90991

[51] Int. Cl.⁴ .................................... B60K 17/34
[52] U.S. Cl. ................................ 180/233; 180/247
[58] Field of Search .............. 180/233, 246, 249, 247

[56] References Cited

U.S. PATENT DOCUMENTS

| 4,417,641 | 11/1983 | Kageyama | 180/233 |
| 4,431,079 | 2/1984 | Suzuki | 180/233 |
| 4,470,489 | 9/1984 | Makita | 192/3.58 |

FOREIGN PATENT DOCUMENTS

| 75219 | 6/1981 | Japan | 180/233 |
| 138020 | 10/1981 | Japan | 180/233 |
| 33025 | 2/1982 | Japan | 180/233 |
| 57-84227 | 5/1982 | Japan | |
| 56929 | 4/1983 | Japan | 180/233 |
| 679435 | 8/1979 | U.S.S.R. | 180/233 |

Primary Examiner—Ira S. Lazarus
Attorney, Agent, or Firm—Lane and Aitken

[57] ABSTRACT

A part-time type four-wheel drive system has a 2WD-4WD changeover means capable of changing the drive system from a four-wheel drive mode to a two-wheel drive mode and vice versa. The four-wheel drive system is equipped with a control system for automatically changing the drive system from the four-wheel drive mode to the two-wheel drive mode by commanding the changeover means when a steering angle of the vehicle becomes equal to or larger than a predetermined angle. The control system may has a vehicle speed sensor. In this case, the control system changes the drive system from the four-wheel drive mode to the two-wheel drive mode only when the vehicle speed is equal to or lower than a predetermined speed.

11 Claims, 8 Drawing Figures

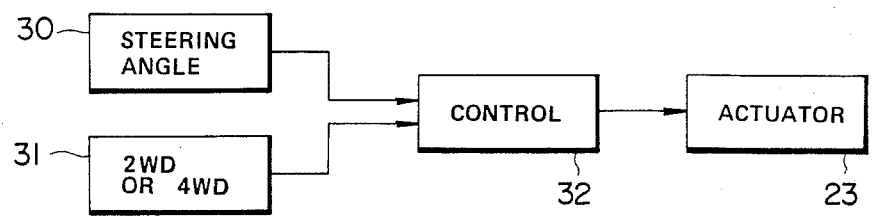
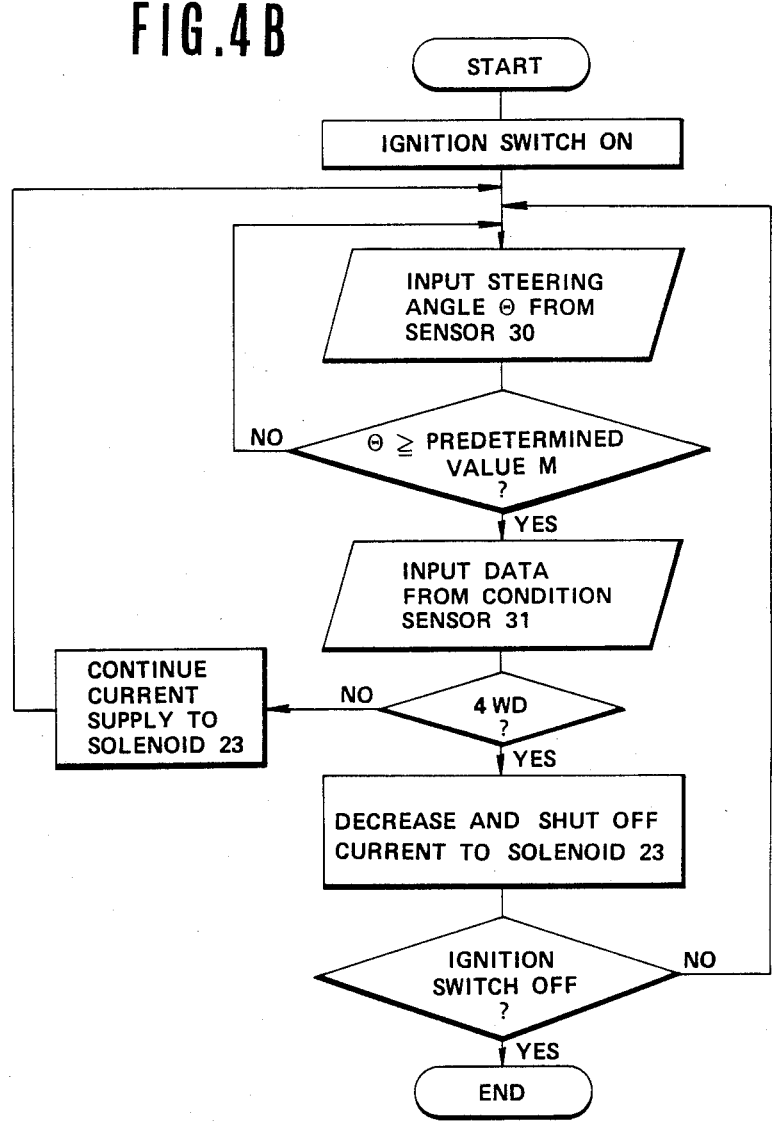

PART-TIME FOUR-WHEEL DRIVE SYSTEM WITH STEERING ANGLE RESPONSIVE CONTROL

BACKGROUND OF THE INVENTION

The present invention relates to a four-wheel drive system of a part-time type having a four-wheel drive mode and a two-wheel drive mode, and more specifically to an automatic control system for a part-time four-wheel drive system, which is arranged to change automatically from the four-wheel mode to the two-wheel mode in accordance with a steering angle of the steerable wheels.

A four-wheel drive vehicle is superior in ability of hill climbing and ability of rough road driving. If, however, all four wheels are always driven at the same speed, a four-wheel drive vehicle cannot be turned smoothly. During a turn at a large steering angle of steerable wheels, the front wheel of an inner or outer side must travel along a circle having a large radius and the rear wheel of the same side must travel along a small circle. Because of this difference in turning radius, there arises a large difference between a rotation speed (an average rotation speed, to be exact) of the front wheels and a rotation speed (an average rotation speed) of the rear wheels. As a result, the steering becomes heavy, the tendency to understeer is increased, and the vehicle cannot be turned without abnormal tire friction (called tight corner brake) which tends to brake the vehicle and cause an engine stall.

To overcome these handling and tire friction problems, some four-wheel drive vehicles are provided with a changeover means capable of changing the state of a four-wheel drive system between a two-wheel drive mode and a four-wheel drive mode. This type of four-wheel drive is called a part-time type. One example of the part-time four-wheel drive vehicle are shown in Japanese Patent provisional publication No. 57-84227.

A four-wheel drive vehicle of the part-time type can be turned through a tight corner very smoothly by holding the drive system in the two-wheel drive mode.

However, a part-time type four-wheel drive vehicle is very difficult and troublesome to control especially for the average driver. If a four-wheel drive vehicle of this type is turned at a large steering angle without changing the drive system from the four-wheel drive mode to the two wheel drive mode, abnormally great torques are exerted on ends of front and rear propeller shafts and axle shaft drivingly connected with the front wheels and the rear wheels. Therefore, the steering of the vehicle becomes very heavy, and there arises a danger of damage to the propeller shafts and the axle shafts. Furthermore, the front wheels and the rear wheels slip in the opposite directions during a turn, so that the tendency to understeer is increased and the effect of the tight corner brake is produced. The average driver cannot understand the reason for such abnormal behavior by the vehicle and cannot negotiate a corner smoothly.

SUMMARY OF THE INVENTION

It is an object of the present invention to provide a part-time type four-wheel drive vehicle which can be turned smoothly, easily and safely.

According to the present invention, a four-wheel wheel drive vehicle comprises an engine, a pair of first wheels and a pair of second wheels, a drive system, and a control system. The drive system is capable of transmitting power from the engine to the first wheels and the second wheels. The drive system comprises changeover means for changing the drive system from a four-wheel drive mode to a two-wheel drive mode and vice versa. The control system comprises means for sensing a steering angle of at least one steerable wheel of the vehicle, condition sensing means for detecting whether the drive system is in the four-wheel drive mode or the two-wheel drive mode, and control means connected with the steering angle sensing means and the condition sensing means for controlling the changeover means in accordance with signals of the steering angle sensing means and the condition sensing means. The control means is arranged to command the changeover means to change the condition of the drive system from the four-wheel drive mode to the two-wheel drive mode if the sensed steering angle is equal to or larger than a predetermined angle and at the same time the drive system is in the four-wheel drive mode.

The changeover means may be arranged to change the drive system gradually from the four-wheel drive mode to the two-wheel drive mode when commanded by the control means. The control system further comprises a vehicle speed sensing means. In this case, the control means is further connected with the vehicle speed sensing means, and arranged to change the drive system from the four-wheel drive mode to the two-wheel drive mode only when the vehicle speed is equal to or lower than a predetermined speed.

BRIEF DESCRIPTION OF THE DRAWINGS

FIG. 4A is a block diagram of a control system of the first embodiment, FIG. 4B is a flowchart for the control system of FIG. 4A.

DETAILED DESCRIPTION OF THE INVENTION

Figure 2:
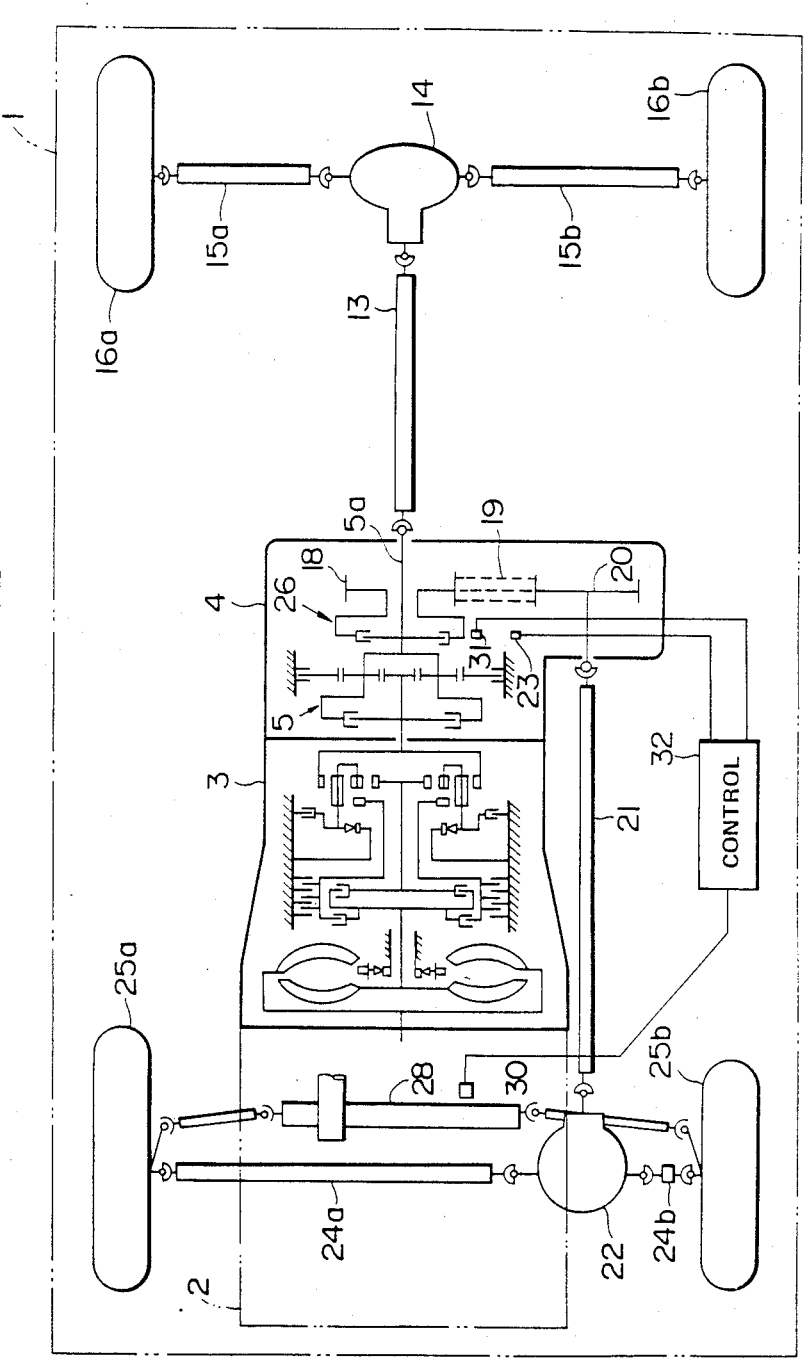
FIG. 2 is a schematic view of a four-wheel drive vehicle of a first embodiment of the present invention.

A first embodiment of the present invention is shown in FIG. 2. An engine 2 is supported on a vehicle body 1. The engine is connected to a transmission 3. The main transmission 3 is connected to a transfer or transfer case 4. The trasnfer 4 has a high-low two-speed change unit 5. The transmission 3 is connected to the high-low change unit 5 of the transfer 4. The high-low change unit 5 has an output shaft 5a. The output shaft 5a of the high-low unit 5 is connected to one end of a rear propeller shaft 13. The other end of the rear propeller shaft 13 is connected with a rear differential unit 14. The rear differential unit 14 is connected to rear wheels 16a and 16b through rear axle shafts 15a and 15b. The rear differential unit 14 allows the right and left rear wheels 16a and 16b to rotate at different speeds, and thereby absorbs a rotational speed difference between the right and left rear wheels 16a and 16b.

A first chain wheel 18 is rotatably mounted on a middle portion of the output shaft 5a of the high-low unit 5. The first chain wheel 18 is connected with a second chain wheel 20 by a chain belt 19. A shaft of the second chain wheel 20 is connected with one end of a front propeller shaft 21. The other end of the front propeller shaft 21 is connected to a front differential unit 22. The front differential unit 22 is connected with front wheels 25a and 25b through front axle shafts 24a and 24b, respectively. The front differential unit 22 allows the right and left front wheels 25a and 25b to rotate at different speeds, and thereby absorbs a rotational speed difference between the right and left front wheels 25a and 25b.

Figure 3:
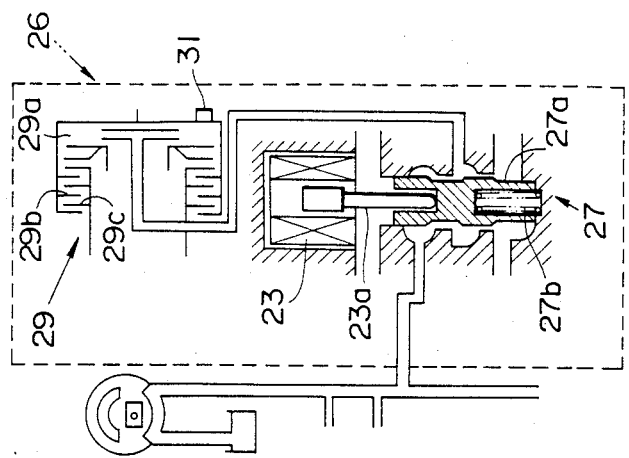
FIG. 3 is a fragmentary sectional schematic view of a 2WD-4WD changeover means used in the vehicle of FIG. 2.

The transfer 4 further has a 2WD-4WD changeover unit 26 disposed between the output shaft 5a of the high-low unit 5 and the first chain wheel 18. As shown in FIG. 3, the changeover unit 26 has a changeover valve 27 connected with a hydraulic system of the vehicle such as the hydraulic system of the transmission 3. The changeover valve 27 has a spool 27a and a spring 27b. The changeover unit 26 has a solenoid 23 having an iron core 23a for moving the spool 27a against the force of the spring 27b. The solenoid 23 serves as an actuator of a control system. The changeover unit 26 further has a hydraulic type multiple disc clutch 29. The clutch 29 is operated by an oil pressure of an oil chamber 29a. The oil chamber 29a is fluidly connected with a port of the changeover valve 27. The multiple disc clutch 29 has a group of first clutch plates 29b and a group of second clutch plates 29c. One of the two groups is connected with the output shaft 5a of the high-low unit 5. The other is connected with the first chain wheel 18. The changeover valve 27 can move the spool 27a with the iron core 23a in accordance with the current passing through the solenoid 23, and thereby control the fluid pressure in the oil chamber 29a by controlling the fluid flow. When the oil pressure in the oil chamber 29a is increased by moving the spool 27a downwards against the spring 27b, the clutch 29 is frictionally engaged and accordingly the drive system is put in the four-wheel drive mode. The clutch 29 is in a slipping state when the oil pressure in the oil chamber 29a is decreased by moving the spool 27a upwards in FIG. 3 with the aid of the spring 27b. When the oil is drained from the oil chamber 29a, the clutch 29 is disengaged and accordingly the drive system is put in the two-wheel drive mode.

The vehicle further has a steering means or mechanism 28 connected with the steerable front wheels 25a and 25b. The steering mechanism 28 is moved by a steering wheel of the vehicle (not shown).

A steering angle sensor 30 is disposed in or near the steering means 28. The steering angle sensor 30 senses a steering angle of the front wheels 25a and 25b by sensing rightward and leftward movements of a movable member (such as a rack) of the steering means 28. The steering angle sensor 30 may be disposed in the steering wheel of the vehicle, or other part of the steering linkage, or in one of the steerable wheels.

There is further provided a sensor 31 for detecting whether the drive system is in the four-wheel drive mode or the two-wheel drive mode. In this embodiment, this sensor 31 detects whether the clutch 29 is engaged or not by monitoring the oil pressure in the oil chamber 29a. If the pressure in the oil chamber 29a is equal to or higher than a predetermined pressure value, the condition sensor 31 estimates that the drive system is in the four-wheel drive mode. If there is little or no fluid pressure in the oil chamber 29a, the condition sensor 31 estimates that the drive system is in the two-wheel drive mode.

A control unit or circuit 32 is connected with the condition sensor 31 and the steering angle sensor 30 for receiving signals from both of the sensors 31 and 35. The control circuit 32 produces a control signal in accordance with the signals of both sensors, and send the control signal to the solenoid (actuator) 23. Thus, a control system is formed as shown in FIG. 4A.

Figure 1:
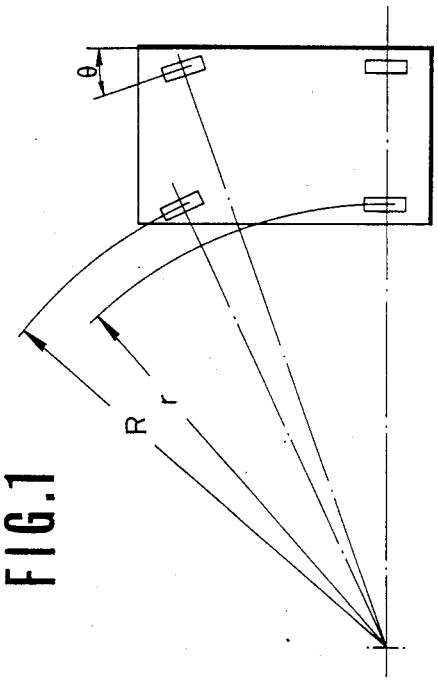
FIG. 1 is a plan view of a vehicle, for showing a turning radius difference between front wheels and rear wheels when a steering angle of steerable wheels is large.

When the drive system is in the two-wheel drive mode, the drive system works in the following manner. When the steering angle $\theta$ of the steerable front wheels 25a and 25b are increased, the radii (R) of arc-shaped paths traveled by the front wheels 25a and 25b become largely different from the radii (r) of arc-shaped paths traveled by the rear wheels 16a and 16b, as shown in FIG. 1. In FIG. 1, only the paths of the inside front and rear wheels are shown. Consequently, there arises a large difference between the average rotation speed of the front wheels 25a and 25b and the average rotation speed of the rear wheels 16a and 16b. The drive system in the two-wheel drive mode absorbs this average rotation speed difference between the front and rear wheels, so that the vehicle can turn smoothly though the steering angle $\theta$ is large.

If either the front wheels 25a and 25b or the rear wheels 16a and 16b are stuck in a muddy ground, and the other wheels lose their power for driving the vehicle, it is possible to move this vehicle out of the muddy ground by actuating the changeover unit 26 to change the drive system from the two-wheel drive mode to the four-wheel drive mode. When the changeover unit 26 is actuated to change the drive system to the four-wheel drive mode, the solenoid 23 is supplied with current and moves the spool 27a with the iron core 23a downwards to the position shown in FIG. 3. With this movement of the spool 27a, the oil pressure in the oil chamber 29a is increased, and the clutch 29 is engaged. Thus, the drive system is changed to the four-wheel drive mode, so that the vehicle can escape from the muddy ground easily.

If the vehicle again starts to run on a normal road before the driver selects the two-wheel drive mode, and the steering angle of the steerable front wheels 25a and 25b is made equal to or larger than a predetermined angle, then the steering angle sensor 30 detects that the steering angle has become equal to or larger than the predetermined angle. At the same time, the condition sensor 31 detects that the clutch 29 is engaged and the drive system is in the four-wheel drive mode. Thus, the signals of the steering angle sensor 30 and the condition sensor 31 are inputted to the control unit 32, which, in turn, sends its control signal to the solenoid or actuator 23 to command the changeover unit 26 to change the drive system from the four-wheel drive mode to the two-wheel drive mode, as shown in the flowchart of FIG. 4B. In response to the control signal of the control unit 32, the current supply to the solenoid 23 is gradually decreased and stopped, and accordingly the changeover valve 27 gradually decreases the oil pressure of the oil chamber 29a by moving the spool 27a upwards in FIG. 3. When the oil pressure of the oil chamber 29a is gradually decreased, the clutch 29 begins slipping, so that the drive system is brought to a condition intermediate between the four-wheel drive mode and the two-wheel drive mode. Finally, the oil is drained from the oil chamber 29a, and the clutch 29 is completely disengaged, so that the drive system is changed completely to the two-wheel drive mode. Thus, the clutch 29 is disengaged gradually with the interposition of the slipping condition. This maintains the steering stability of the vehicle by preventing an abrupt change of the cornering characteristic of the vehicle. In this way, the changeover unit 26 is automatically actuated and the drive system is automatically changed to the two-wheel drive mode. In the two-wheel drive mode, the wheels not driven by the engine are allowed to rotate at a speed different from a speed of the wheels driven by the engine. Therefore, the vehicle can be turned smoothly notwithstanding a large steering angle.

This control system can prevent the propeller shafts 13 and 21 and the axle shafts 15a, 15b, 24a and 24b from suffering from abnormally large torque which would be produced if the drive system remains in the four-wheel drive mode. This control system, therefore, can prevent the steering of the vehicle from becoming heavy and avoid the danger of damage to these shafts. Furthermore, this control system can prevent the front wheels 25a and 25b and the rear wheels 16a and 16b from slipping in the opposite directions during a turn, so that the tendency to understeer and the tight corner brake can be prevented. This four-wheel drive vehicle is very easy to control and very suitable to the average driver.

Figure 5:
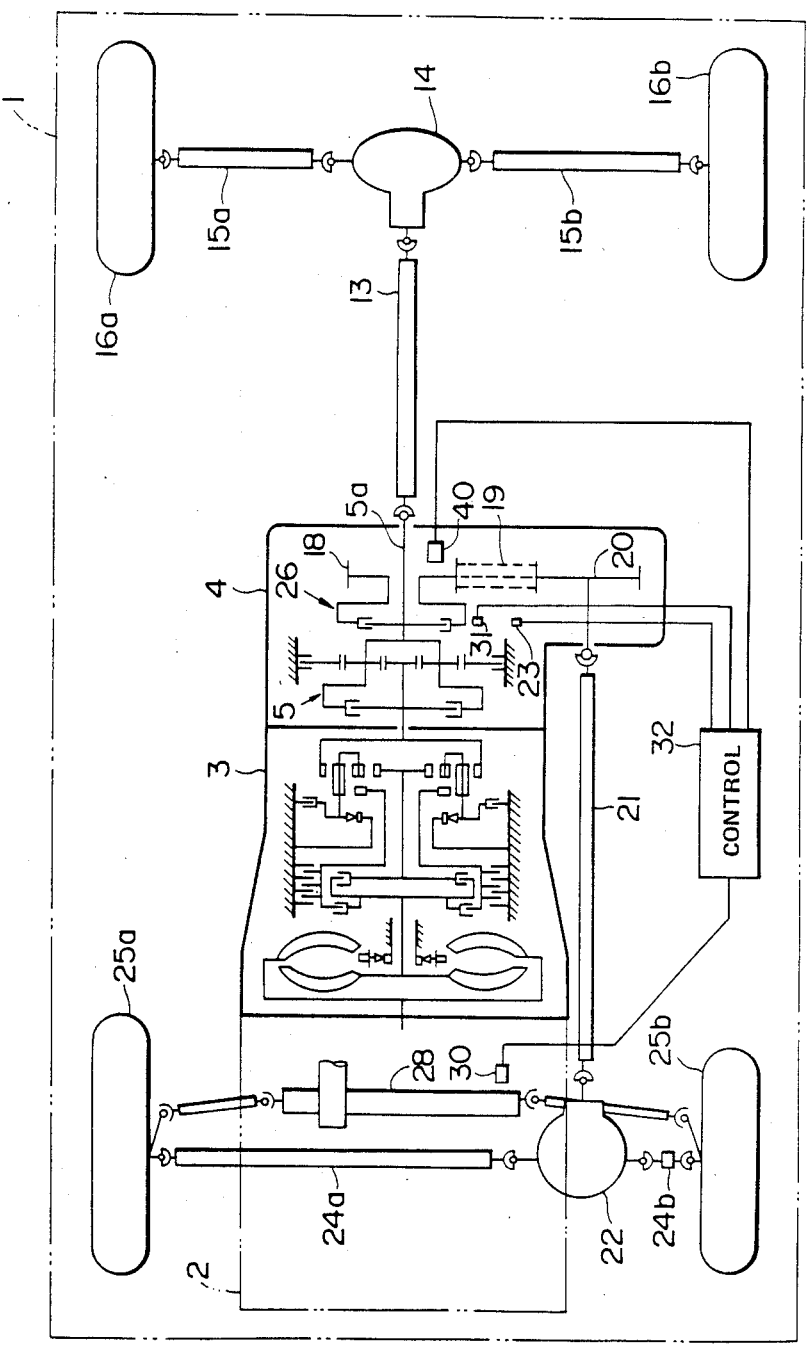
FIG. 5 is a schematic view of a four-wheel drive vehicle of a second embodiment of the present invention.
Figure 6A:
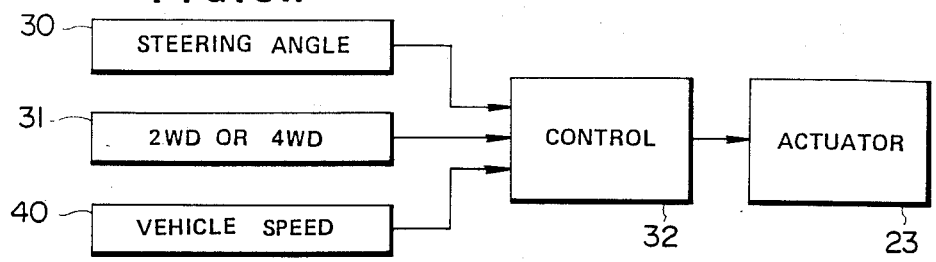
FIG. 6A is a block diagram of a control system of the second embodiment.
Figure 6B:
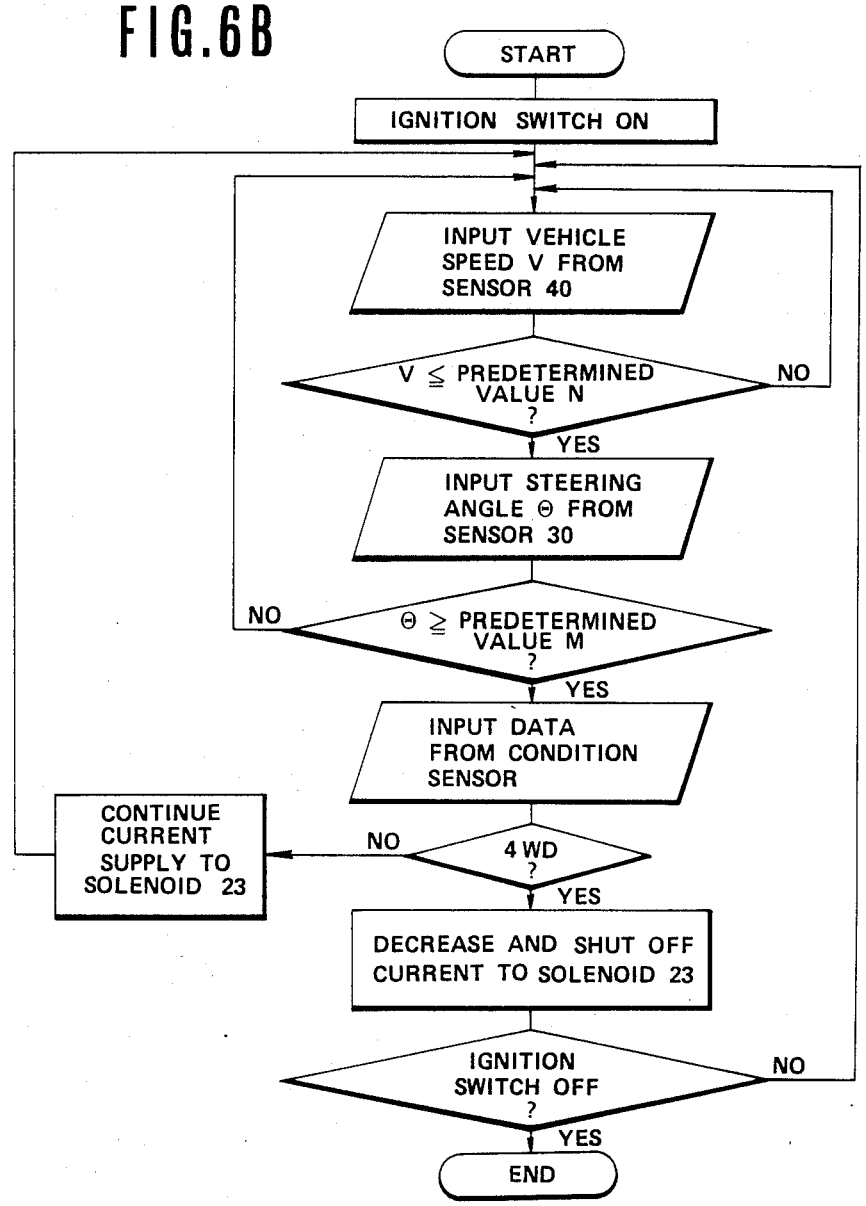
FIG. 6B is a flowchart for the control system of FIG. 6A.

A second embodiment of the present invention is shown in FIG. 5. In the second embodiment, there is further provided a vehicle speed sensor 40. The vehicle speed sensor 40 senses the speed of the vehicle by sensing the rpm of the output shaft 5a of the high-low change unit 5. When the drive system is in the four-wheel drive mode, the vehicle is turned with the tendency to understeer due to the effect of the tight corner brake. When the drive system is in the two-wheel drive mode, the vehicle is turned in the condition of neutral steer. Thus, the cornering characteristic of the vehicle is changed depending upon whether the drive system is in the two-wheel drive mode or the four-wheel drive mode. If the cornering characteristic of the vehicle is changed while the vehicle is running at high speeds, there is a great possibility that the vehicle will be oversteered, or the directional control of the vehicle will be lost. In order to avoid such a danger and ensure the safety of the vehicle, the control system of the second embodiment is arranged to change the drive system from the four-wheel drive mode to the two-wheel drive mode only when the vehicle speed is equal to or lower than a predetermined speed. As shown in FIG. 6A, the control unit 32 of the second embodiment is connected with the steering angle sensor 30, the condition sensor 31 and the vehicle speed sensor 40 to receive the signals from these sensors. If (1) the steering angle of the front wheels 25a and 25b is equal to or larger than a predetermined angle, (2) the drive system is in the four-wheel drive mode, and (3) the vehicle speed is equal to or lower than the predetermined speed, then the control unit 32 sends the control signal to the solenoid or actuator 23, and commands the changeover unit 26 to disengage the clutch 29 by decreasing the current supply to the solenoid 23 and thereby to change the drive system from the four-wheel drive mode to the two-wheel drive mode, as shown in the flowchart of FIG. 6B. This control system can ensure the safety of the vehicle by preventing the drive system from being changed from the four-wheel drive mode to the two-wheel drive mode while the vehicle is running at a speed higher than the predetermined speed.

What is claimed is:

1. A four-wheel drive vehicle comprising:
   an engine
   a pair of first wheels and a pair of second wheels,
   a drive system capable of transmitting torque from said engine to said first wheels and said second wheels, said drive system comprising changeover means for changing said drive system from a four-wheel drive mode to a two-wheel drive mode and vice versa, said changeover means comprising a clutch; and
   a control system comprising:
   means for sensing a steering angle of at least one steerable wheel of the vehicle,
   condition sensing means for detecting whether said drive system is in the four-wheel drive mode or the two-wheel drive mode,
   means for sensing the speed of the vehicle, and
   control means connected with said steering angle sensing means and said condition sensing means, for controlling said changeover means in accordance with signals of said steering angle sensing means and said condition sensing means, said control means being arranged to command said changeover means to change the condition of said drive system from the four-wheel drive mode to the two-wheel drive mode if the sensed steering angle is equal to or larger than a predetermined angle and at the same time said drive system is is the four-wheel drive mode, said control means being further connected with said speed sensing means and arranged to command said changeover means to change said drive system from the four-wheel drive mode to the two-wheel drive mode only when the sensed vehicle speed is equal to or lower than a predetermined speed.

2. A vehicle according to claim 1, wherein said changeover means has an engaged state and a disengaged state, said drive system being in the four-wheel drive mode when said changeover means is in the engaged state, and in the two-wheel drive mode when said changeover means is in the disengaged state, said changeover means enabling said drive system to transmit power from said engine to said first wheels when said changeover means is in the engaged state, and disabling said drive system from transmitting power from said engine to said first wheels when said changeover means is in the disengaged state.

3. A vehicle according to claim 2, wherein said changeover means is arranged to change said drive system gradually from the four-wheel drive mode to the two-wheel drive mode when commanded by said control system.

4. A vehicle according to claim 3, wherein said condition sensing means detects the condition of said drive system by detecting whether said changeover means is in the engaged state or the disengaged state.

5. A vehicle according to claim 4, wherein said first wheels are front wheels of the vehicle and steerable, and said second wheels are rear wheels of the vehicle.

6. A vehicle according to claim 5, wherein said drive system comprises a rear drive member adapted to be driven by said engine, and connected to said rear wheels for driving said rear wheels, and a front drive member connected to said front wheels for driving said front wheels, and wherein said clutch of said changeover means is disposed between said rear and front drive members, said clutch being engaged to connect said front drive member with said rear drive member so that said front drive member can be driven by said engine through said rear drive member when said changeover means is in the engaged state, said clutch being disengaged to disconnect said front drive member from said rear drive member when said changeover means is in the disengaged state.

7. A vehicle according to claim 6, wherein said clutch is operated by a fluid pressure, and said changeover means further comprises actuating means for controlling the fluid pressure.

8. A vehicle according to claim 7, wherein said condition sensing means monitors the fluid pressure.

9. A vehicle according to claim 8, wherein said clutch is completely engaged when the fluid pressure is within a first range, disengaged when the fluid pressure is within a second range, and slippingly engaged when the fluid pressure is within an intermediate range between said first range and said second range.

10. A vehicle according to claim 9, wherein said control means is arranged to command said changeover means to vary the fluid pressure gradually to said second range if the sensed steering angle is equal to or larger than the predetermined angle and at the same time the fluid pressure is within said first range or said intermediate range.

11. A vehicle according to claim 10, wherein said drive system further comprises a front differential between said front wheels and a rear differential between said rear wheels.

* * * * *